(12) United States Patent
Lee

(10) Patent No.: US 11,570,208 B2
(45) Date of Patent: Jan. 31, 2023

(54) ELECTRONIC DEVICE AND CONTROL METHOD THEREOF

(71) Applicant: Samsung Electronics Co., Ltd., Suwon-si (KR)

(72) Inventor: Joonghwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 16/775,627

(22) Filed: Jan. 29, 2020

(65) Prior Publication Data
US 2020/0252426 A1 Aug. 6, 2020

(30) Foreign Application Priority Data
Feb. 1, 2019 (KR) .................. 10-2019-0013900

(51) Int. Cl.
*H04L 9/40* (2022.01)
*H04L 45/128* (2022.01)

(52) U.S. Cl.
CPC ...... *H04L 63/1466* (2013.01); *H04L 45/1287* (2013.01); *H04L 63/1416* (2013.01)

(58) Field of Classification Search
CPC ............... H04L 45/122; H04L 45/1287; H04L 63/1416; H04L 63/1466; H04L 63/168; H04W 12/102
See application file for complete search history.

(56) References Cited

U.S. PATENT DOCUMENTS

| | | |
|---|---|---|
| 9,680,860 B1 | 6/2017 | Wallace et al. |
| 10,148,688 B1 * | 12/2018 | Shavell ............... H04L 63/1466 |
| 10,440,053 B2 * | 10/2019 | Wyatt .................... H04L 43/12 |
| 10,778,780 B2 | 9/2020 | Jung et al. |
| 2007/0177499 A1 | 8/2007 | Gavrilescu et al. |
| 2010/0153537 A1 | 6/2010 | Wang et al. |
| 2015/0358345 A1 | 12/2015 | Clark et al. |
| 2016/0028695 A1 * | 1/2016 | Binder ................... H04L 63/18 726/12 |
| 2017/0070419 A1 * | 3/2017 | Singhal .................. H04L 67/14 |
| 2017/0237773 A1 | 8/2017 | Wallace et al. |

(Continued)

FOREIGN PATENT DOCUMENTS

| | | |
|---|---|---|
| JP | 2017-147558 A | 8/2017 |
| KR | 10-0906300 B1 | 7/2009 |

(Continued)

OTHER PUBLICATIONS

International Search Report with Written Opinion dated May 19, 2020; International Appln. No. PCT/KR2020/001486.

*Primary Examiner* — Daniel B Potratz
*Assistant Examiner* — Matthias Habtegeorgis
(74) *Attorney, Agent, or Firm* — Jefferson IP Law, LLP

(57) ABSTRACT

An electronic device and a control method thereof are provided. The electronic device includes an Internet protocol (IP) address corresponding to a domain name of a web page when a user command inputting the domain name is received, identifies a number of hops included in a network path connecting a server corresponding to the obtained IP address and the electronic device to each other, and determines that a man-in-the-middle attack exists in a network when a communication connection with the server is established on the basis of a smaller number of hops than the identified number of hops.

20 Claims, 9 Drawing Sheets

(56) References Cited

U.S. PATENT DOCUMENTS

2017/0295088 A1* 10/2017 van der Kluit ..... H04L 45/1287
2018/0013788 A1   1/2018 Vissamsetty et al.
2018/0109498 A1   4/2018 Singh
2018/0176248 A1*  6/2018 Nikravesh ........... H04L 63/1458
2018/0367619 A1  12/2018 Jung et al.
2019/0044974 A1*  2/2019 Hayward ............ H04L 63/1466
2019/0222588 A1*  7/2019 Marzorati ........... H04L 63/1466

FOREIGN PATENT DOCUMENTS

| KR | 10-2012-0068294 A | 6/2012 |
| KR | 10-1293954 B1 | 8/2013 |
| KR | 10-2016-0002269 A | 1/2016 |
| KR | 10-2018-0137254 A | 12/2018 |

\* cited by examiner

ELECTRONIC DEVICE AND CONTROL METHOD THEREOF

CROSS-REFERENCE TO RELATED APPLICATION(S)

This application is based on and claims priority under 35 U.S.C. § 119(a) of a Korean patent application number 10-2019-0013900, filed on Feb. 1, 2019, in the Korean Intellectual Property Office, the disclosure of which is incorporated by reference herein in its entirety.

BACKGROUND

1. Field

The disclosure relates to apparatuses and methods consistent with the disclosure relate to an electronic device and a control method thereof. More particularly, the disclosure relates to an electronic device capable of detecting a man-in-the-middle attack by confirming network reachability, and a control method thereof.

2. Description of the Related Art

When an electronic device performs communication with a server providing a web page, various types of man-in-the-middle (MITM) attacks may be conducted on a network path connecting the electronic device and the server to each other. Therefore, there is a risk that information of a user will be stolen.

Specifically, the MITM attack may be conducted by a method in which a man-in-the-middle intercepts a hypertext transfer protocol secure (HTTPS) response transmitted by the server and falsifies the HTTPS response to induce the electronic device and the server to perform communication with each other by a hypertext transfer protocol (HTTP) rather than an HTTPS and a method in which the man-in-the-middle circumvents application of an HTTP strict transport security (HSTS) by returning a sub-domain looking similar to an input domain address.

Furthermore, the MITM attack may be conducted by a method in which when the electronic device performs an HTTPS request, the man-in-the-middle hacks a root certificate to generate a forged certificate on the spot, and performs an HTTPS connection with the server simultaneously with performing an HTTPS connection with the electronic device on the basis of the forged certificate to sniff information of a user.

To cope with the various types of MITM attacks as described above, various defect methods have been repeatedly developed. However, a method of the MITM attack that may circumvent or disable these defense methods has also been continuously developed.

Therefore, the necessity for a detection method of an MITM attack that may be applied to various types of MITM attacks without being limited to a specific attack scenario of an MITM has increased.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure overcome the above disadvantages and other disadvantages not described above.

The disclosure provides an electronic device capable of detecting a man-in-the-middle attack by confirming network reachability, and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a communicator, a memory including at least one command, and at least one processor configured to execute the at least one command to obtain an Internet protocol (IP) address corresponding to a domain name of a web page when a user command inputting the domain name is received, identify a number of hops included in a network path connecting a server corresponding to the obtained IP address and the electronic device to each other, and determine that a man-in-the-middle attack exists in a network when a communication connection with the server is established on the basis of a smaller number of hops than the identified number of hops.

In accordance with another aspect of the disclosure, the at least one processor may be further configured to identify the number of hops included in the network path connecting the server corresponding to the obtained IP address and the electronic device to each other on the basis of information on the number of hops stored in the memory.

In accordance with another aspect of the disclosure, the at least one processor may be further configured to identify the number of hops included in the network path connecting the server corresponding to the obtained IP address and the electronic device to each other when a hypertext transfer protocol (HTTP) connection with the server is established on the basis of the obtained IP address, and determine that the man-in-the-middle attack exists in the network when the communication connection with the server is established on the basis of the smaller number of hops than the identified number of hops.

In accordance with another aspect of the disclosure, the at least one processor may be further configured to identify the number of hops included in the network path connecting the server corresponding to the obtained IP address and the electronic device to each other when a hypertext transfer protocol secure (HTTPS) connection with the server is established on the basis of the obtained IP address, and determine that the man-in-the-middle attack exists in the network when the communication connection with the server is established on the basis of the smaller number of hops than the identified number of hops.

In accordance with another aspect of the disclosure, the at least one processor may be further configured to identify the number of hops included in the network path connecting the server corresponding to the obtained IP address and the electronic device to each other when it is determined that the IP address corresponding to the domain name and an IP address corresponding to a domain name different from the domain name are the same as each other, and determine that the man-in-the-middle attack exists in the network when the communication connection with the server is established on the basis of the smaller number of hops than the identified number of hops.

In accordance with another aspect of the disclosure, the at least one processor may be further configured to identify the number of hops included in the network path connecting the server corresponding to the obtained IP address and the electronic device to each other when the obtained IP address is a public IP address, and determine that the man-in-the-middle attack exists in the network when the communication connection with the server is established on the basis of the smaller number of hops than the identified number of hops.

In accordance with another aspect of the disclosure, the at least one processor may be further configured to obtain the IP address corresponding to the domain name of the web page when the user command inputting the domain name is received, and determine that the man-in-the-middle attack exists in the network when the communication connection with the server corresponding to the obtained IP address is established on the basis of one hop.

In accordance with another aspect of the disclosure, the at least one processor is further configured to provide a notification for security of the network through an output when it is determined that the man-in-the-middle attack exists in the network.

In accordance with another aspect of the disclosure, the at least one processor may be further configured to end the communication connection with the server when it is determined that the man-in-the-middle attack exists in the network.

In accordance with another aspect of the disclosure, the at least one processor may be further configured to transmit information on security of the network to an external device connected to the electronic device through the communicator when it is determined that the man-in-the-middle attack exists in the network.

In accordance with another aspect of the disclosure, a control method of an electronic device is provided. The control method includes obtaining an IP address corresponding to a domain name of a web page when a user command inputting the domain name is received, identifying a number of hops included in a network path connecting a server corresponding to the obtained IP address and the electronic device to each other, and determining that a man-in-the-middle attack exists in a network when a communication connection with the server is established on the basis of a smaller number of hops than the identified number of hops.

In accordance with another aspect of the disclosure, in the identifying of the number of hops, the number of hops included in the network path connecting the server corresponding to the obtained IP address and the electronic device to each other may be identified on the basis of information on the number of hops stored in a memory.

In accordance with another aspect of the disclosure, in the identifying of the number of hops, the number of hops included in the network path connecting the server corresponding to the obtained IP address and the electronic device to each other may be identified when an HTTP connection with the server is established on the basis of the obtained IP address.

In accordance with another aspect of the disclosure, in the identifying of the number of hops, the number of hops included in the network path connecting the server corresponding to the obtained IP address and the electronic device to each other may be identified when an HTTPS connection with the server is established on the basis of the obtained IP address.

In accordance with another aspect of the disclosure, in the identifying of the number of hops, the number of hops included in the network path connecting the server corresponding to the obtained IP address and the electronic device to each other may be identified when it is determined that the IP address corresponding to the domain name and an IP address corresponding to a domain name different from the domain name are the same as each other.

In accordance with another aspect of the disclosure, in the identifying of the number of hops, the number of hops included in the network path connecting the server corresponding to the obtained IP address and the electronic device to each other may be identified when the obtained IP address is a public IP address.

In accordance with another aspect of the disclosure, in the determining that the man-in-the-middle attack exists, it may be determined that the man-in-the-middle attack exists in the network when the communication connection with the server corresponding to the obtained IP address is established on the basis of one hop.

In accordance with another aspect of the disclosure, the control method may further include providing a notification for security of the network when it is determined that the man-in-the-middle attack exists in the network.

In accordance with another aspect of the disclosure, the control method may further include ending the communication connection with the server when it is determined that the man-in-the-middle attack exists in the network.

In accordance with another aspect of the disclosure, the control method may further include transmitting information on security of the network to an external device connected to the electronic device when it is determined that the man-in-the-middle attack exists in the network.

In accordance with another aspect of the disclosure, a computer readable recording medium is provided. The computer readable recording medium includes a program for executing a control method of an electronic device, wherein the control method comprises obtaining an IP address corresponding to a domain name of a web page when a user command inputting the domain name is received, identifying a number of hops included in a network path connecting a server corresponding to the obtained IP address and the electronic device to each other, and determining that a man-in-the-middle attack exists in a network when a communication connection with the server is established on the basis of a smaller number of hops than the identified number of hops.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
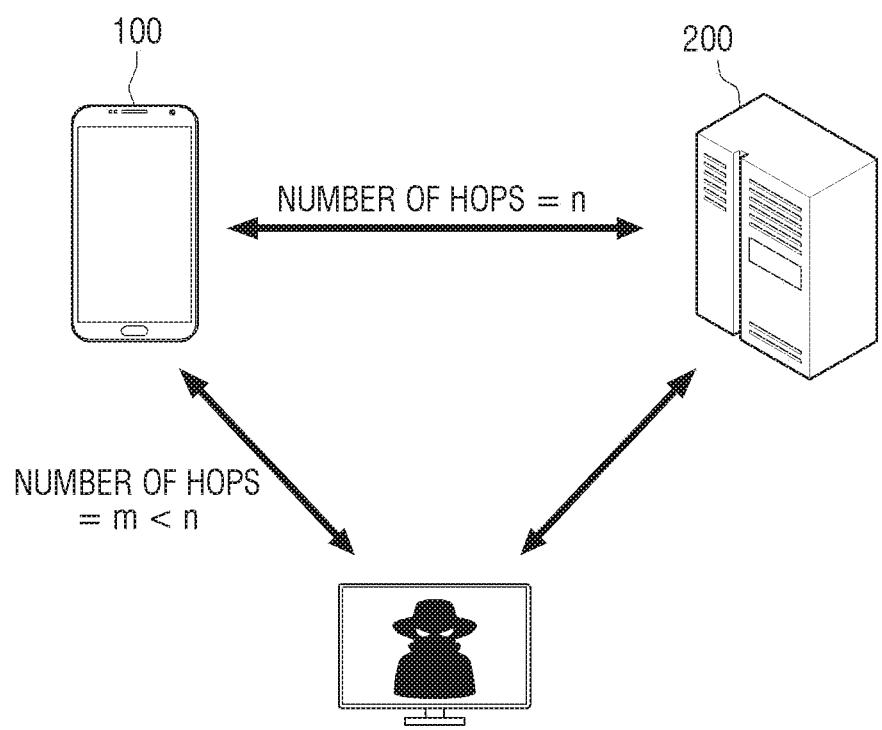
FIG. 1 is a view for schematically describing a detection process of a man-in-the-middle attack according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding to the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, the following embodiments may be modified in several different forms, and the scope and spirit of the disclosure are not limited to the following embodiments. Rather, these embodiments make the disclosure thorough and complete, and are provided to completely transfer the spirit of the disclosure to those skilled in the art.

Terms used in the disclosure are used only to describe specific embodiments rather than limiting the scope of the disclosure. Singular forms are intended to include plural forms unless the context clearly indicates otherwise.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions "first", "second", or the like, used in the disclosure may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component).

However, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware.

Instead, in some situations, an expression "a device configured to" may mean that the device may "do" together with other devices or components. For example, a phrase "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Various elements and regions in the drawings are schematically illustrated. Therefore, the spirit of the disclosure is not limited by relatively sizes or intervals illustrated in the accompanying drawings.

Electronic devices according to diverse embodiments of the disclosure may include at least one of, for example, a smartphone, a tablet personal computer (PC), a desktop PC, a laptop PC, or a wearable device. The wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), or a living body implantation type wearable device.

In some embodiments, the electronic device may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, TV™ of Apple Inc, or TV™ of Google), a game console (for example Xbox™ PlayStation™), an electronic dictionary, an electronic key, a camcorder, or a digital photo frame.

In other embodiments, the electronic device may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, or Internet of things (IoT) devices (for example, a light bulb, various sensors, a sprinkler system, a fire alarm, a thermostat, a street light, a toaster, an exercise equipment, a hot water tank, a heater, a boiler, and the like).

Hereinafter, embodiments of the disclosure will be described in detail with reference to the accompanying drawings so that those skilled in the art to which the disclosure pertains may easily practice the disclosure.

FIG. 1 is a view for schematically describing a detection process of a man-in-the-middle attack according to an embodiment of the disclosure.

Referring to FIG. 1, an electronic device 100 according to an embodiment of the disclosure may perform communication with a server 200 providing a web site.

In addition, in communication using a transmission control protocol/Internet protocol (TCP/IP), such as the Internet, an encryption protocol such as a secure socket layer (SSL) may be applied to a communication section to prevent important information from being exposed in a data transmission process between the electronic device 100 and the server 200.

However, in a case in which the SSL is not applied or is applied to only a specific communication section, various types of man-in-the-middle attacks such as SSL Strip, SSL Strip+, and SSL split may be conducted on a network path connecting the electronic device 100 and the server 200 to each other. Therefore, there is a risk that information of a user will be stolen. Hereinafter, the various types of man-in-the-middle attacks will be first described.

For example, a man-in-the-middle attack may be conducted by a method in which a man-in-the-middle intercepts a hypertext transfer protocol secure (HTTPS) response transmitted by the server 200 and falsifies the HTTPS response to induce the electronic device 100 and the server 200 to perform communication with each other by a hypertext transfer protocol (HTTP) rather than an HTTPS. Such a method is called an SSL strip method.

Specifically, when the electronic device 100 accesses a web page provided by the server 200 using the HTTP, the man-in-the-middle may receive an HTTP request transmitted by the electronic device 100 through a malicious access point or the like, and transmit the received HTTP request to the server 200.

Then, in a case in which encryption communication is required, as in a case in which a login to a web site is performed by a user of the electronic device 100, the server 200 may transmit the HTTPS response so that the SSL may be applied. In this case, the man-in-the-middle may receive the HTTPS response transmitted by the server 200, falsify the received HTTPS response to the HTTP, and transmit the falsified response to the electronic device 100.

Then, the electronic device 100 receiving the response falsified to the HTTP transmits information including account information or the like of the user to the server 200 through the HTTP in a state in which the SSL is not applied. In this case, the man-in-the-middle may receive and sniff the information transmitted by the user.

To prevent the SSL strip type of man-in-the-middle attack as described above, a defense method such as an HTTP strict transport security (HSTS) may be applied. The HSTS is a method of forcing the use of the HTTPS at a client level, and when the HSTS is applied, even though the user inputs an HTTP address to a web browser, he/she is automatically connected to a web page using the HTTPS, such that the SSL strip type of man-in-the-middle attack may be prevented in advance.

However, there is a man-in-the-middle attack method in which the man-in-the-middle may circumvent the application of the HSTS as described above by returning a sub-domain looking similar to an input domain address. Such a method is called an SSL strip+method.

Specifically, when the electronic device 100 performs a domain name system (DNS) request to obtain an IP address corresponding to an input domain name, the man-in-the-middle may return a sub-domain looking similar to an input domain address to the electronic device 100 through DNS spoofing, which is a method of falsifying a DNS that is a protocol serving to link the domain name and the IP address to each other.

For example, when the electronic device 100 performs the DNS request to obtain an IP address corresponding to www.ABC.com, which is the input domain name, the man-in-the-middle may return a sub-domain "www.ABC.com" to the electronic device 100.

In this case, because the HSTS is not applied to the sub-domain in principle, the electronic device 100 may perform communication by the HTTP on the basis of the sub-domain, and a communication content may be thus sniffed or falsified by the man-in-the-middle.

In a case in which the HSTS is set to be applied to all sub-domains, preparations for the SSL Strip+attack as described above may be made, but when considering a load of the server 200 and an development and operation environment, it is difficult to apply the HSTS to all the sub-domains.

Furthermore, recently, there is a method in which when the electronic device 100 performs an HTTPS request, the man-in-the-middle hacks a root certificate to generate a forged certificate on the spot, and performs an HTTPS connection with the server 200 simultaneously with performing an HTTPS connection with the electronic device 100 on the basis of the forged certificate to sniff information transmitted by the user. Such a method is called an SSL split method.

To detect the man-in-the-middle attack as described above, the electronic device 100 according to the disclosure may attempt a communication connection with the server 200 on the basis of a smaller number of hops than the number of hops included in the network path connecting the electronic device 100 and the server 200 to each other, and detect whether or not the man-in-the-middle attack occurs on the basis of whether or not the communication connection is established according to the attempt. Hereinafter, a detection method of a man-in-the-middle attack of the electronic device 100 according to an embodiment of the disclosure will be described.

First, when a user command inputting a domain name of a web page is received, the electronic device 100 obtains an IP address corresponding to the domain name. Specifically, when the user command inputting the domain name of the web page is received, the electronic device 100 may obtain the IP address corresponding to the input domain name from a DNS server. Hereinafter, unless explicitly stated as a DNS server, in describing the disclosure, the term "server 200" refers to a server 200 providing the web page.

Here, the user command inputting the domain name of the web page is not limited to a user command for accessing the web page. That is, the user command inputting the domain name of the web page may include a user command for designating a specific domain name to allow the detection process of a man-in-the-middle attack according to the disclosure to be performed on an IP address corresponding to the designated domain name.

For example, the user command inputting the domain name of the web page may be a user command for inputting a domain name such as www.ABC.com in an address bar of the web browser to access a web page corresponding to the input domain name. The user command inputting the domain name of the web page may also be a user command for inputting a domain name such as www.ABC.com to designate an IP address corresponding to the input domain name and allow the detection process of a man-in-the-middle attack according to the disclosure to be performed on the designated IP address.

Furthermore, an embodiment in which when the user command inputting the domain name of the web page is received, the IP address corresponding to the domain name input by the user is obtained and the man-in-the-middle attack for the obtained IP address is detected has been described hereinabove, but the disclosure may also be applied to a case in which the IP address is input directly by the user. Particularly, in a case in which the user of the electronic device directly manages a specific web page, the user may directly input an IP address corresponding to the specific web page to allow the detection process of a man-in-the-middle attack according to the disclosure to be performed on the input IP address. When the IP address corresponding to the domain name is obtained, the electronic device 100 identifies the number of hops included in the network path connecting the server 200 corresponding to the obtained IP address and the electronic device 100 to each other. Here, the hop refers to a part of a path positioned between an origination and a destination of a network. In addition, the number of hops is the number of intermediate devices through which a data packet should pass in a process of starting from the origination of the network and then arriving at the destination of the network, and becomes a reference in measuring a network distance.

In addition, the number of hops included in the network path may be identified on the basis of information obtained by the electronic device 100 or information input by a network manager. Specifically, the number of hops can be identified on the basis of information obtained through a utility such as a trace route recording information on each section included in the path from the origination to the destination of the network. In addition, the number of hops may be identified through information input by the network manager recognizing each path from the origination to the destination of the network.

Information on the number of hops as described above may be updated by the electronic device 100 or the network manager. Specifically, the electronic device 100 may receive the information on the number of hops from an external device connected to the electronic device 100, and identify the number of hops included in the network path connecting the server 200 and the electronic device 100 to each other on the basis of the received information on the number of hops. Particularly, the electronic device 100 may receive the information on the number of hops from an external device on the basis of synchronization through a cloud computing system.

As the information on the number of hops is updated as described above, how much the information on the number of hops pre-stored in the electronic device 100 will be maintained may be changed according to an implementation of the disclosure.

When the number of hops included in the network path connecting the server 200 and the electronic device 100 to each other is identified, the electronic device 100 attempts a communication connection with the server 200 on the basis of a smaller number of hops than the identified number of hops.

Specifically, as illustrated in FIG. 1, in a case in which the number of hops included in the network path connecting the server 200 and the electronic device 100 to each other is n, the electronic device 100 may attempt a communication connection with the server 200 on the basis of m hops less than the identified number of hops.

In addition, when the communication connection with the server 200 is established on the basis of the smaller number of hops than the identified number of hops, the electronic device 100 determines that the man-in-the-middle attack exists in the network.

That is, in a case in which the man-in-the-middle attack does not exist in the network connecting the server 200 and the electronic device 100 to each other, even though a communication connection with the server 200 is attempted on the basis of the smaller number of hops than the identified number of hops, the communication connection may not be established, but in a case in which the man-in-the-middle attack exists, a communication connection may be established in a relationship with the man-in-the-middle on the basis of the smaller number of hops than the identified number of hops.

For example, in a case in which the number of hops included in the network path connecting the server 200 and the electronic device 100 to each other is identified as ten, when a communication connection with the server 200 is established on the basis of five hops, the electronic device 100 may determine that the man-in-the-middle attack exists at a position within a fifth hop from the electronic device 100.

Furthermore, the electronic device 100 may attempt a communication connection while sequentially increasing the number of hops from one hop. For example, the electronic device 100 may attempt a communication connection with the server 200 on the basis of one hop, attempt a communication connection with the server 200 on the basis of two hops when the communication connection with the server 200 is not established on the basis of the one hop, and attempt a communication connection with the server 200 on the basis of three hops when the communication connection with the server 200 is not established on the basis of the two hops.

A process of determining whether or not the communication connection is established on the basis of the smaller number of hops than the identified number of hops may be performed by setting a time to live (TTL) value included in a header of an IP packet to be smaller than the identified number of hops to attempt a TCP handshake and determining whether or not the communication connection is established according to the attempt.

Furthermore, the process of determining whether or not the communication connection is established on the basis of the smaller number of hops than the identified number of hops may also be performed by setting a TTL value included in a header of an IP packet to be the same as the identified number of hops to attempt a TCP handshake and determining whether or not a TTL value included in a response packet to the attempt is smaller than the TTL value of the IP packet.

According to an embodiment of the disclosure, the electronic device 100 may perform a filtering process before performing the detection process of a man-in-the-middle attack, and perform the detection process of a man-in-the-middle as described above only in a case in which an IP corresponds to an IP in which a possibility that the man-in-the-middle attack will occur is relatively high.

Specifically, the electronic device 100 may perform the detection process of a man-in-the-middle attack as described above in at least one of a case in which an HTTP connection with the server 200 is established on the basis of the obtained IP address, a case in which an HTTPS connection with the server 200 is established on the basis of the obtained IP address, a case in which it is determined that an IP address corresponding to a first domain name and an IP address corresponding to a second domain name different from the first domain name are the same as each other, or a case in which the obtained IP address is a public IP address.

The filtering process that may be performed before performing the detection process of a man-in-the-middle attack will be described in detail with reference to FIGS. 3A, 3B and 4.

As described above, the electronic device 100 according to an embodiment of the disclosure may attempt the communication connection with the server 200 on the basis of the smaller number of hops than the number of hops included in the network path connecting the electronic device 100 and the server 200 to each other, and detect the man-in-the-middle attack on the basis of reachability according to the attempt.

In addition, the disclosure is not limited to a specific attack scenario of the man-in-the-middle attack, and may be applied to various types of man-in-the-middle attacks in that the man-in-the-middle attack is detected by confirming the reachability itself with the man-in-the-middle.

Figure 2:
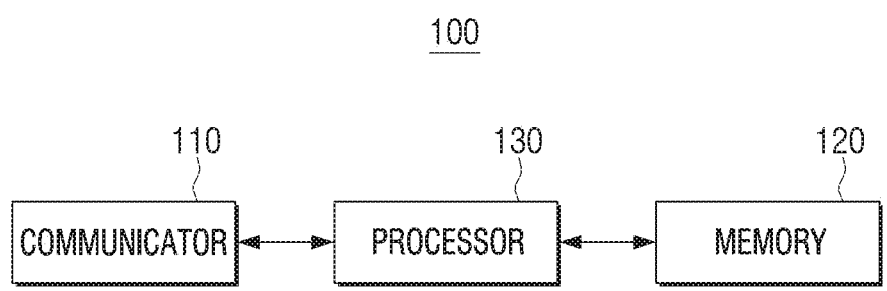
FIG. 2 is a block diagram schematically illustrating components of an electronic device according to an embodiment of the disclosure.

FIG. 2 is a block diagram schematically illustrating components of an electronic device according to an embodiment of the disclosure.

Referring to FIG. 2, the electronic device 100 according to an embodiment of the disclosure includes a communicator 110, a memory 120, and at least one processor 130.

The communicator 110 may include a circuit and perform communication with a server or an external device. Specifically, the processor 130 may receive various data or information from the server or the external device connected to the electronic device through the communicator 110, and transmit various data or information to the server or the external device.

The communicator 110 may include at least one of a wireless fidelity (WiFi) module 111, a Bluetooth module 112, a wireless communication module 113, or a near field communication (NFC) module 114. Specifically, the WiFi module 111 and the Bluetooth module 112 may perform communication in a WiFi manner and a Bluetooth manner, respectively. In a case of using the WiFi module 111 or the Bluetooth module 112, various kinds of connection information such as a service set identifier (SSID) and the like, may be first transmitted and received, communication may be connected using the connection information, and various kinds of information may be transmitted and received.

In addition, the wireless communication module 113 may perform communication according to various communication protocols such as Institute of Electrical and Electronics Engineers (IEEE), Zigbee, 3rd generation (3G), 3rd generation partnership project (3GPP), long term evolution (LTE), 5th generation (5G), and the like. In addition, the NFC module 114 may perform communication in an NFC manner using a band of 13.56 MHz among various radio frequency identification (RFID) frequency bands such as 135 kHz, 13.56 MHz, 433 MHz, 860 to 960 MHz, 2.45 GHz, and the like.

Particularly, in diverse embodiments of the disclosure, the processor 130 may obtain an IP address corresponding to a domain name of a web page through the communicator 110. In addition, the processor 130 may receive information on the number of hops from the external device connected to the electronic device through the communicator 110.

In addition, when it is determined that the man-in-the-middle attack exists in the network connecting the server 200 corresponding to the obtained IP address and the electronic device 100 to each other according to the disclosure, the processor 130 may transmit information on security of the network to the external device connected to the electronic device through the communicator 110.

At least one command regarding the electronic device 100 may be stored in the memory 120. In addition, an operating system (O/S) for driving the electronic device 100 may be stored in the memory 120. In addition, various software programs or applications for operating the electronic device 100 according to diverse embodiments of the disclosure may also be stored in the memory 120. In addition, the memory 120 may include a semiconductor memory such as a flash memory or the like, or a magnetic storing medium such as a hard disk or the like.

In addition, various software modules for operating the electronic device 100 according to diverse embodiments of the disclosure may be stored in the memory 120, and the processor 130 may execute the various software modules stored in the memory 120 to control an operation of the electronic device 100. That is, the memory 120 may be accessed by the processor 130, and readout, recording, correction, deletion, update, and the like, of data in the memory 120 may be performed by the processor 130.

In the disclosure, the term "memory" may be used with regard to one or more of the memory 120, a read only memory (ROM) (not illustrated) in the processor 130, a random access memory (RAM) (not illustrated), or a memory card (not illustrated) (for example, a micro secure digital (SD) card or a memory stick) mounted in the electronic device 100.

Particularly, in diverse embodiments of the disclosure, the IP address obtained from the DNS server and various types of information on the obtained IP address may be stored in the memory 120. In addition, the obtained IP address may be stored in the memory 120 in a form in which it is mapped to the domain name.

In addition, the information on the number of hops included in the network path connecting the server 200 corresponding to the obtained IP address and the electronic device 100 to each other may be stored in the memory 120. Further, the information on the number of hops may be updated by the electronic device 100 or the network manager. Therefore, the information on the number of hops stored in the memory 120 may also be updated.

In addition, as the information on the number of hops is updated, how much the information on the number of hops pre-stored in the memory 120 will be maintained may be changed according to an implementation of the disclosure.

The processor 130 controls a general operation of the electronic device 100. Specifically, the processor 130 may be connected to components of the electronic device 100 including the communicator 110 and the memory 120 as described above, and may execute at least one command stored in the memory 120 as described above to generally control the operation of the electronic device 100.

The processor 130 may be implemented in various manners. For example, the processor 130 may be implemented by at least one of an application specific integrated circuit (ASIC), an embedded processor, a microprocessor, a hardware control logic, a hardware finite state machine (FSM), or a digital signal processor (DSP). In the disclosure, the term "processor" 130 may be used as the meaning including a central processing unit (CPU), a graphic processing unit (GPU), a main processing unit (MPU), and the like.

Particularly, in diverse embodiments of the disclosure, the processor 130 may attempt the communication connection with the server 200 on the basis of the smaller number of hops than the number of hops included in the network path connecting the electronic device 100 and the server 200 to each other, and detect whether or not the man-in-the-middle attack occurs on the basis of whether or not the communication connection is established according to the attempt. Hereinafter, a detection method of a man-in-the-middle attack of the electronic device 100 according to an embodiment of the disclosure will be described.

First, when the user command inputting the domain name of the web page is received, the processor 130 obtains the IP address corresponding to the domain name. Specifically, when the user command inputting the domain name of the web page is received, the processor 130 may obtain the IP address corresponding to the input domain name from the DNS server.

Here, the user command inputting the domain name of the web page is not limited to a user command for accessing the web page. That is, the user command inputting the domain name of the web page may include a user command for designating a specific domain name to allow the detection process of a man-in-the-middle attack according to the disclosure to be performed on an IP address corresponding to the designated domain name.

For example, the user command inputting the domain name of the web page may be a user command for inputting a domain name such as www.ABC.com in an address bar of the web browser to access a web page corresponding to the input domain name. The user command inputting the domain name of the web page may also be a user command for inputting a domain name such as www.ABC.com to designate an IP address corresponding to the input domain name and allow the detection process of a man-in-the-middle attack according to the disclosure to be performed on the designated IP address.

Furthermore, an embodiment in which when the user command inputting the domain name of the web page is received, the IP address corresponding to the domain name input by the user is obtained and the man-in-the-middle attack for the obtained IP address is detected has been described hereinabove, but the disclosure may also be applied to a case in which the IP address is input directly by the user. Particularly, in a case in which the user of the electronic device directly manages a specific web page, the user may directly input an IP address corresponding to the specific web page to allow the detection process of a man-in-the-middle attack according to the disclosure to be performed on the input IP address.

When the IP address corresponding to the domain name is obtained, the processor 130 identifies the number of hops included in the network path connecting the server 200 corresponding to the obtained IP address and the electronic device 100 to each other. Here, the hop refers to a part of a path positioned between an origination and a destination of a network. In addition, the number of hops is the number of intermediate devices through which a data packet should pass in a process of starting from the origination of the network and then arriving at the destination of the network, and becomes a reference in measuring a network distance.

In addition, the number of hops included in the network path may be identified on the basis of information obtained by the electronic device 100 or information input by a network manager. Specifically, the number of hops can be identified on the basis of information obtained through a utility such as a trace route recording information on each section included in the path from the origination to the destination of the network. In addition, the number of hops may be identified through information input by the network manager recognizing each path from the origination to the destination of the network.

Information on the number of hops as described above may be updated by the electronic device 100 or the network manager. Specifically, the processor 130 may receive the information on the number of hops from the external device connected to the electronic device through the communicator 110, and identify the number of hops included in the network path connecting the server 200 and the electronic device 100 to each other on the basis of the received information on the number of hops. Particularly, the processor 130 may receive the information on the number of hops from the external device on the basis of synchronization through a cloud computing system, through the communicator 110.

When the number of hops included in the network path connecting the server 200 and the electronic device 100 to each other is identified, the processor 130 attempts the communication connection with the server 200 on the basis of the smaller number of hops than the identified number of hops. In addition, when the communication connection with the server 200 is established on the basis of the smaller number of hops than the identified number of hops, the processor 130 determines that the man-in-the-middle attack exists in the network.

That is, in a case in which the man-in-the-middle attack does not exist in the network connecting the server 200 and the electronic device 100 to each other, even though a communication connection with the server 200 is attempted on the basis of the smaller number of hops than the identified number of hops, the communication connection may not be established, but in a case in which the man-in-the-middle attack exists, a communication connection may be established in a relationship with the man-in-the-middle on the basis of the smaller number of hops than the identified number of hops.

For example, in a case in which the number of hops included in the network path connecting the server 200 and the electronic device 100 to each other is identified as ten, when the communication connection with the server 200 is established on the basis of five hops, the processor 130 may determine that the man-in-the-middle attack exists at a position within a fifth hop from the electronic device 100.

A process of determining whether or not the communication connection is established on the basis of the smaller number of hops than the identified number of hops may be performed by setting a TTL value included in a header of an IP packet to be smaller than the identified number of hops to attempt a TCP handshake and determining whether or not the communication connection is established according to the attempt.

Furthermore, the process of determining whether or not the communication connection is established on the basis of the smaller number of hops than the identified number of hops may also be performed by setting a TTL value included in a header of an IP packet to be the same as the identified number of hops to attempt a TCP handshake and determining whether or not a TTL value included in a response packet to the attempt is smaller than the TTL value of the IP packet.

An embodiment in which the processor 130 identifies the number of hops included in the network path connecting the electronic device 100 and the server 200 to each other has been described hereinabove, but the disclosure is not necessarily limited thereto.

That is, according to another embodiment of the disclosure, even in a case in which the number of hops included in the network path connecting the electronic device 100 and the server 200 to each other is not identified, the processor 130 may attempt a communication connection on the basis of a specific number of hops and determine whether or not the man-in-the-middle attack is detected on the basis of whether or not the communication connection is established according to the attempt.

Specifically, when the user command inputting the domain name of the web page is received, the processor 130 may obtain the IP address corresponding to the domain name, and attempt the communication connection with the server 200 corresponding to the obtained IP address on the basis of one hop. In addition, when the communication connection is established according to the attempt, the processor 130 may determine that the man-in-the-middle attack exists in the network.

That is, because it is generally obvious that the number of hops included in the network path connecting the electronic device 100 and the server 200 to each other is two or more, even in the case in which the number of hops included in the network path connecting the electronic device 100 and the server 200 to each other is not identified, the processor 130 may attempt the communication connection with the server 200 corresponding to the obtained IP address on the basis of one hop to detect the man-in-the-middle attack.

Particularly, when the communication connection is established by attempting the communication connection with the server 200 corresponding to the obtained IP address on the basis of one hop, the electronic device 100 may determine that the man-in-the-middle attack exists at a position within a first hop from the electronic device 100. In addition, in this case, the man-in-the-middle attack existing at the position within the first hop from the electronic device 100 may be a man-in-the-middle attack for an access point for WiFi communication with the server 200 or a man-in-the-middle attack in the same sub-network as the access point.

An embodiment in which the communication connection is attempted on the basis of a specific number of hops and the man-in-the-middle attack is detected according to the attempt even in the case in which the number of hops included in the network path connecting the electronic device 100 and the server 200 to each other is not identified will be described in more detail with reference to FIG. 5.

According to an embodiment of the disclosure, the processor 130 may perform a filtering process before performing the detection process of a man-in-the-middle attack, and perform the detection process of a man-in-the-middle attack as described above only in a case in which an IP corresponds to an IP in which a possibility that the man-in-the-middle attack will occur is relatively high.

Specifically, the processor 130 may perform the detection process of a man-in-the-middle attack as described above in at least one of a case in which an HTTP connection with the server 200 is established on the basis of the obtained IP address, a case in which an HTTPS connection with the server 200 is established on the basis of the obtained IP address, a case in which it is determined that an IP address corresponding to a first domain name and an IP address corresponding to a second domain name different from the first domain name are the same as each other, or a case in which the obtained IP address is a public IP address.

The filtering process that may be performed before performing the detection process of a man-in-the-middle attack will be described in detail with reference to FIGS. 3A, 3B and 4. However, the detection process of a man-in-the-middle attack has been described in detail in a description for FIGS. 1 and 2, and an overlapping description therefor is thus omitted.

Figure 3A:
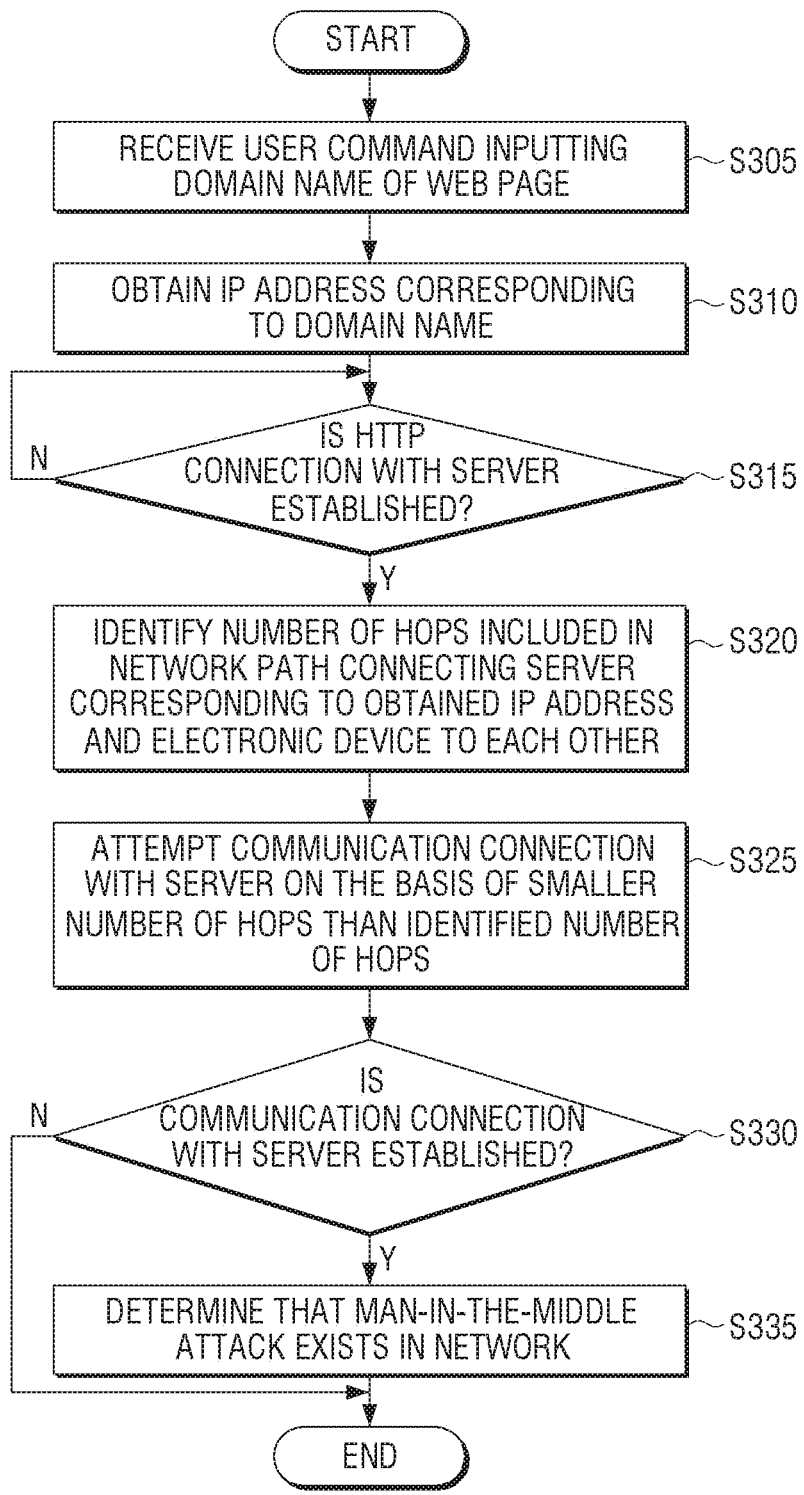
FIGS. 3A and 3B are flowcharts for describing the detection process of a man-in-the-middle attack according to various embodiments of the disclosure.
Figure 3B:
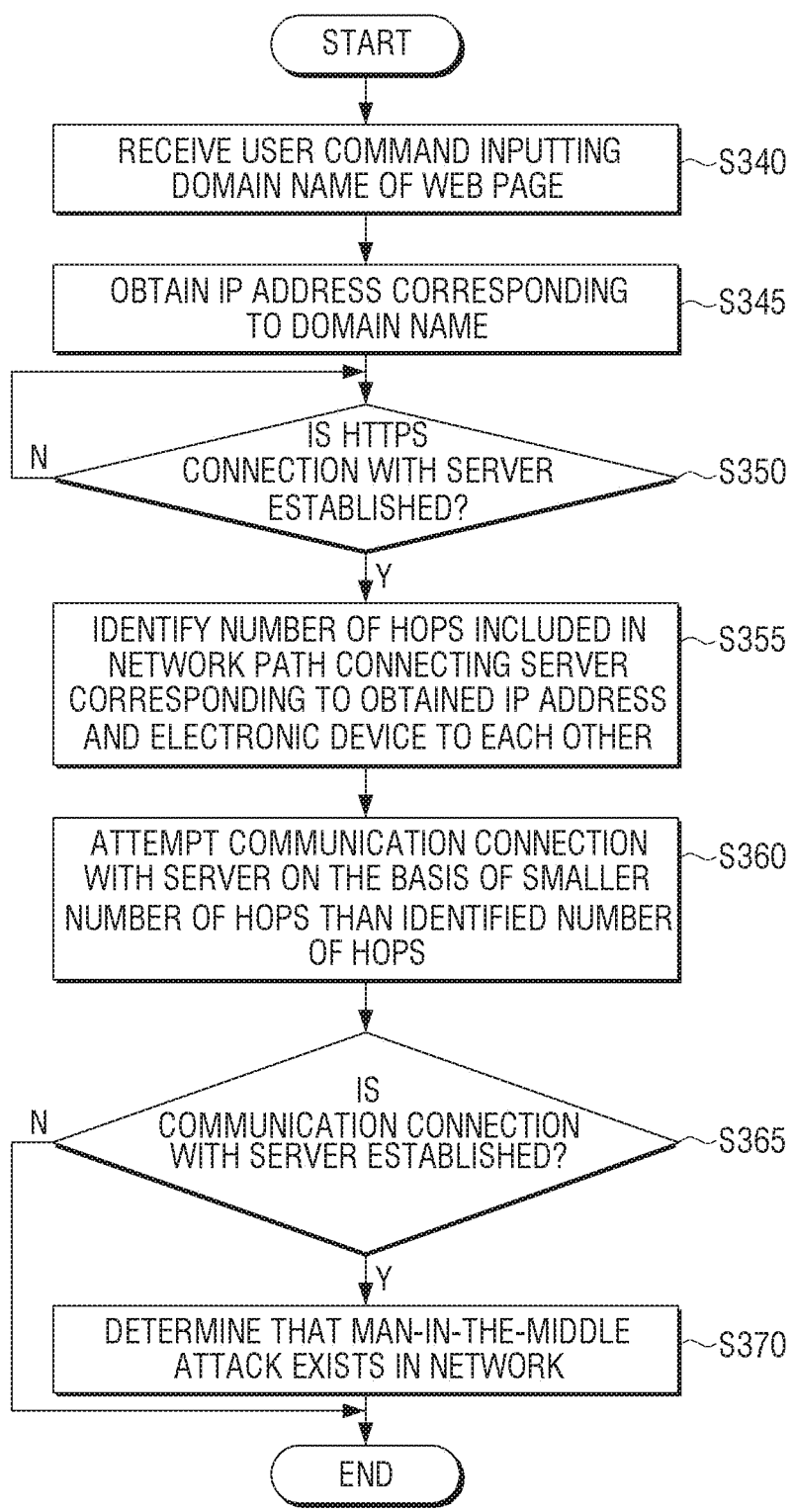

FIGS. 3A and 3B are flowcharts for describing a detection process of a man-in-the-middle attack according to an embodiment of the disclosure in detail.

As described above, according to an embodiment of the disclosure, the electronic device 100 may perform the filtering process before performing the detection process of a man-in-the-middle attack, and perform the detection process of a man-in-the-middle attack as described above only in a case in which an IP corresponds to an IP in which a possibility that the man-in-the-middle attack will occur is relatively high.

As described above, the man-in-the-middle attack such as the SSL strip method in which the man-in-the-middle intercepts the HTTPS response transmitted by the server 200 and falsifies the HTTPS response to induce the electronic device 100 and the server 200 to perform communication with each other by the HTTP rather than the HTTPS or the SSL strip+method in which the man-in-the-middle circumvents the application of the HSTS as described above to induce the HTTP communication by returning the sub-domain looking similar to the input domain address may be conducted on the network path connecting the electronic device 100 and the server 200 to each other.

Therefore, referring to FIG. 3A, the electronic device 100 according to an embodiment of the disclosure may perform the detection process of a man-in-the-middle attack as described above only in a case in which the HTTP connection with the server 200 is established on the basis of the obtained IP address. That is, the electronic device 100 may perform the detection process of a man-in-the-middle attack as described above only in a case in which the communication connection with the server 200 is established using a TCP port of TCP port No. 80 on the basis of the obtained IP address.

Specifically, when the user command inputting the domain name of the web page is received at S305, the electronic device 100 may obtain the IP address corresponding to the input domain name at S310.

In addition, when the HTTP connection between the electronic device 100 and the server 200 is not established at S315 (N), the electronic device 100 may not perform the detection process of the man-in-the-middle attack. However, when the HTTP connection between the electronic device 100 and the server 200 is established at S315 (Y), the electronic device 100 may identify the number of hops included in the network path connecting the server 200 corresponding to the obtained IP address and the electronic device 100 to each other at S320.

When the number of hops included in the network path connecting the server 200 and the electronic device 100 to each other is identified, the electronic device 100 may attempt the communication connection with the server 200 on the basis of the smaller number of hops than the identified number of hops at S325.

In addition, when the communication connection with the server 200 is established on the basis of the smaller number of hops than the identified number of hops at S330 (Y), the electronic device 100 may determine that the man-in-the-middle attack exists in the network at S335. Otherwise, the operation ends at S330 (N).

As described above, the man-in-the-middle attack such as the SSL Split method in which when the electronic device 100 performs an HTTPS request, the man-in-the-middle hacks the root certificate to generate the forged certificate on the spot, and performs the HTTPS connection with the server 200 simultaneously with performing the HTTPS connection with the electronic device 100 on the basis of the forged certificate to sniff the information transmitted by the user may be conducted.

Therefore, referring to FIG. 3B, the electronic device 100 according to an embodiment of the disclosure may perform the detection process of a man-in-the-middle attack as described above only in a case in which the HTTPS connection with the server 200 is established on the basis of the obtained IP address. That is, the electronic device 100 may perform the detection process of a man-in-the-middle attack as described above only in a case in which the communication connection with the server 200 is established using a TCP port of TCP port No. 443 on the basis of the obtained IP address.

Specifically, when the user command inputting the domain name of the web page is received at S340, the electronic device 100 may obtain the IP address corresponding to the input domain name at S345.

In addition, when the HTTPS connection between the electronic device 100 and the server 200 is not established at S350 (N), the electronic device 100 may not perform the detection process of the man-in-the-middle attack. However, when the HTTPS connection between the electronic device 100 and the server 200 is established at S350 (Y), the electronic device 100 may identify the number of hops included in the network path connecting the server 200 corresponding to the obtained IP address and the electronic device 100 to each other at S355.

When the number of hops included in the network path connecting the server 200 and the electronic device 100 to each other is identified, the electronic device 100 may attempt the communication connection with the server 200 on the basis of the smaller number of hops than the identified number of hops at S360.

In addition, when the communication connection with the server 200 is established on the basis of the smaller number of hops than the identified number of hops at S365 (Y), the electronic device 100 may determine that the man-in-the-middle attack exists in the network at S370. Otherwise, the operation ends at S365 (N).

According to another embodiment of the disclosure, the electronic device 100 may perform the detection process of a man-in-the-middle attack as described above only in a case in which the HTTPS connection with the server 200 is established on the basis of the obtained IP address and the root certificate corresponds to the hacked IP address. In addition, information related to the hacking of the root certificate may be received in real time from the external device.

An embodiment in which the detection process of a man-in-the-middle attack as described above is performed only in the case in which the HTTP or HTTPS connection with the server 200 is established on the basis of the obtained IP address has been described hereinabove, but an additional filtering condition may be combined with the embodiment as described above.

Specifically, according to another embodiment of the disclosure, the detection process of a man-in-the-middle attack as described above may be performed only in a case in which the obtained IP address is a public IP address and the HTTP connection with the server 200 is established on the basis of the obtained IP address, and the detection process of a man-in-the-middle attack as described above may be performed only in a case in which the obtained IP address is a public IP address and the HTTPS connection with the server 200 is established on the basis of the obtained IP address.

Figure 4:
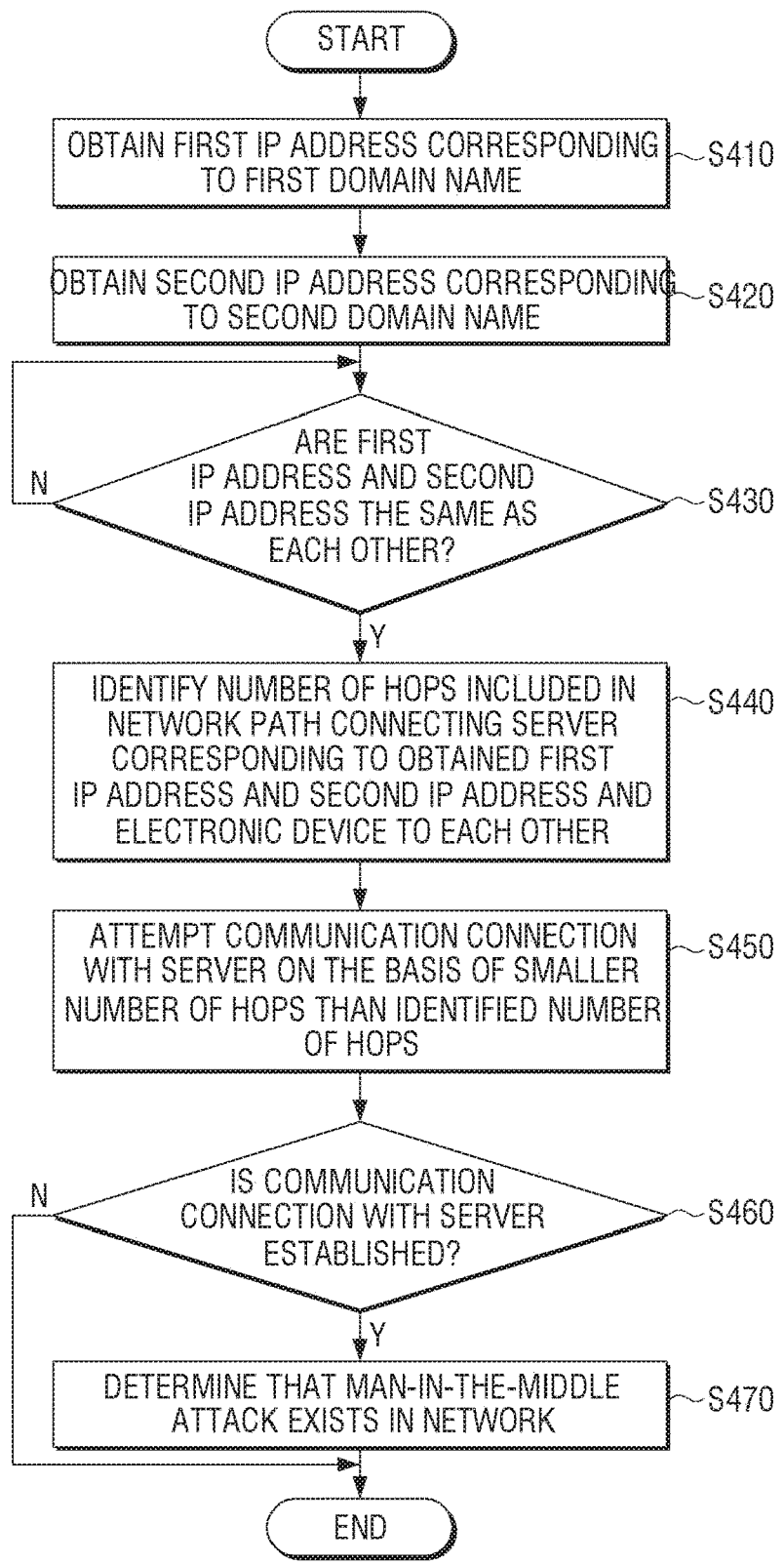
FIG. 4 is a flowchart for describing a detection process of a man-in-the-middle attack according to another embodiment of the disclosure.

FIG. 4 is a flowchart for describing a detection process of a man-in-the-middle attack according to another embodiment of the disclosure.

As described above, the man-in-the-middle attack such as the SSL strip+method in which the man-in-the-middle circumvents the application of the HSTS as described above to induce the HTTP communication by returning the sub-domain looking similar to the input domain address may be conducted on the network path connecting the electronic device 100 and the server 200 to each other.

In addition, as described above, according to an embodiment of the disclosure, for the purpose of efficiency of the detection process of a man-in-the-middle attack according to the disclosure, the detection process of a man-in-the-middle attack as described above may be performed only in a case in which an IP corresponds to an IP in which a possibility that the man-in-the-middle attack will occur is relatively high.

Referring to FIG. 4, the electronic device 100 according to an embodiment of the disclosure may perform the detection process of a man-in-the-middle attack as described above only in a case in which it is determined that an IP address corresponding to a first domain name and an IP address corresponding to a second domain name different from the first domain name are the same as each other.

Specifically, the electronic device 100 may obtain the first IP address corresponding to the first domain name at S410, and may obtain the second IP address corresponding to the second domain name at S420. In addition, the first IP address and the second IP address corresponding to the first domain name and the second domain name, respectively, may be obtained from the DNS server according to a DNS request for obtaining IP addresses corresponding to the respective domain names.

The obtainment of the IP addresses according to the DNS request may be performed according to reception of the user command inputting the domain name of the web page. That is, the electronic device 100 may obtain the first IP address corresponding to the first domain name according to a first user command inputting the first domain name, and may obtain the second IP address corresponding to the second domain name according to a second user command inputting the second domain name.

In this case, when the first IP address and the second IP address are the same as each other, it may be a case in which the server 200 providing the web page provides multiple domain names corresponding to the IP address. For example, it may be a case in which the server 200 providing the web page provides www.ABC.com and www.ABC1.com as domain names corresponding to the IP address.

Furthermore, the obtainment of the IP address according to the DNS request may be performed on each of a plurality of domain names obtained by the electronic device 100. Particularly, the obtainment of the IP address according to the DNS request may also be performed on a domain name included in a response of the server 200 to the HTTP request of the electronic device 100 or a domain name included in a response of the man-in-the-middle to the HTTP request of the electronic device 100.

For example, when the user command inputting the first domain name is received, the electronic device 100 may obtain the first IP address corresponding to the input domain name. In this case, the man-in-the-middle may return the second domain name, which is a sub-domain looking similar to the first domain name, to the electronic device 100, and the electronic device 100 obtaining the sub-domain name may perform a DNS request for obtaining an IP address corresponding to the obtained sub-domain name to obtain the second IP address. In addition, in a case in which the man-in-the-middle attack exists in the network connecting the server 200 and the electronic device 100 to each other, the first IP address and the second IP address may be the same as each other.

As described above, when the obtained first IP address and second IP address are the same as each other, it may be a case in which the man-in-the-middle attack exists in the network connecting the server 200 and the electronic device 100 to each other.

Therefore, when the first IP address and the second IP address are obtained, the electronic device 100 determines whether or not the first IP address and the second IP address are the same as each other. In addition, when the first IP address and the second IP address are not the same as each other at S430 (N), the electronic device 100 may not perform the detection process of a man-in-the-middle attack. However, when the first IP address and the second IP address are the same as each other at S430 (Y), the electronic device 100 may identify the number of hops included in the network path connecting the server 200 corresponding to the obtained first IP address and second IP address and the electronic device 100 to each other at S440.

When the number of hops included in the network path connecting the server 200 and the electronic device 100 to each other is identified, the electronic device 100 may attempt the communication connection with the server 200 on the basis of the smaller number of hops than the identified number of hops at S450.

In addition, when the communication connection with the server 200 is established on the basis of the smaller number of hops than the identified number of hops at S460 (Y), the electronic device 100 may determine that the man-in-the-middle attack exists in the network at S470. Otherwise, the operation ends at S460 (N).

Diverse embodiments of the disclosure including the filtering process have been described hereinabove with reference to FIGS. 3A, 3B, and 4. However, a filtering condition according to the disclosure is not limited to that of an embodiment of each of FIGS. 3A, 3B, and 4, and the detection process of a man-in-the-middle attack as described above may be performed only in a case in which two or more of a plurality of filtering conditions are satisfied.

For example, the detection process of a man-in-the-middle attack as described above may be performed only in a case in which it is determined that the IP address corresponding to the first domain name and the IP address corresponding to the second domain name different from the first domain name are the same each other, the obtained IP address is the public IP address, and the HTTP connection with the server 200 is established on the basis of the obtained IP address.

That is, the filtering process as described above is for efficiency of the detection process of a man-in-the-middle attack according to the disclosure, and any filtering condition may be additionally combined with the filtering condition as described above as long as it is a condition for selecting a case in which an IP corresponds to an IP in which a possibility that the man-in-the-middle attack will occur is relatively high.

According to the diverse embodiments of the disclosure as described above with reference to FIGS. 3A to 4 hereinabove, the efficiency of the detection process of a man-in-the-middle attack may be improved by performing the filtering process before performing the detection process of a man-in-the-middle attack and performing the detection process of a man-in-the-middle attack as described above only in the case in which the IP corresponds to the IP in which the possibility that the man-in-the-middle attack will occur is relatively high.

Figure 5:
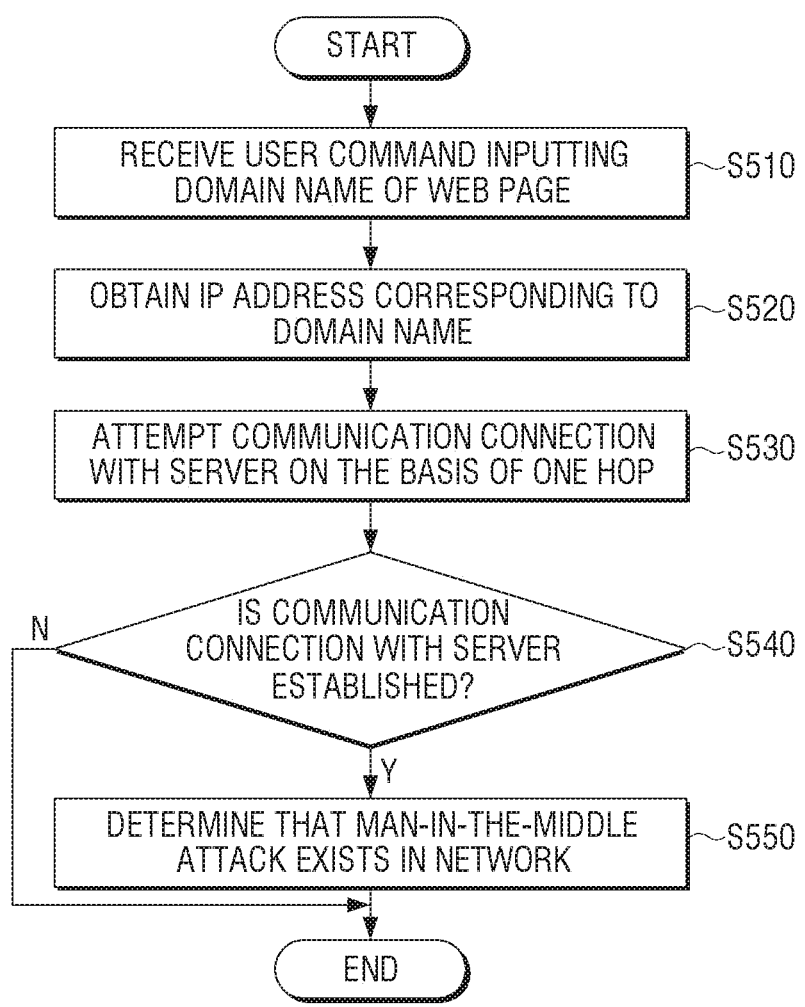
FIG. 5 is a flowchart for describing a detection process of a man-in-the-middle attack according to another embodiment of the disclosure.

FIG. 5 is a flowchart for describing a detection process of a man-in-the-middle attack according to another embodiment of the disclosure.

An embodiment in which the processor identifies the number of hops included in the network path connecting the electronic device 100 and the server 200 to each other has been described hereinabove, but the disclosure is not necessarily limited thereto.

That is, according to another embodiment of the disclosure, even in a case in which the number of hops included in the network path connecting the electronic device 100 and the server 200 to each other is not identified, the processor 130 may attempt a communication connection on the basis of a specific number of hops and determine whether or not the man-in-the-middle attack is detected on the basis of whether or not the communication connection is established according to the attempt.

Referring to FIG. 5, when the user command inputting the domain name of the web page is received at S510, the electronic device 100 may obtain the IP address corresponding to the domain name at S520.

When the IP address corresponding to the domain name is obtained, the electronic device 100 may attempt the communication connection with the server 200 corresponding to the obtained IP address on the basis of one hop at S530. In addition, when the communication connection with the server 200 is established on the basis of the one hop at S540 (Y), the electronic device 100 may determine that the man-in-the-middle attack exists in the network at S550. Otherwise, the operation ends at S540 (N).

That is, because it is generally obvious that the number of hops included in the network path connecting the electronic device 100 and the server 200 to each other is two or more, even in the case in which the number of hops included in the network path connecting the electronic device 100 and the server 200 to each other is not identified, the processor 130 may attempt the communication connection with the server 200 corresponding to the obtained IP address on the basis of one hop to detect the man-in-the-middle attack.

Particularly, when the communication connection is established by attempting the communication connection with the server 200 corresponding to the obtained IP address on the basis of one hop, the electronic device 100 may determine that the man-in-the-middle attack exists at a position within a first hop from the electronic device 100. In addition, in this case, the man-in-the-middle attack existing at the position within the first hop from the electronic device 100 may be a man-in-the-middle attack for an access point for WiFi communication with the server 200 or a man-in-the-middle attack in the same sub-network as the access point.

An embodiment in which the communication connection with the server 200 is attempted on the basis of the one hop has been described hereinabove, but the disclosure is not limited thereto. That is, according to an embodiment of the disclosure, the electronic device 100 may attempt the communication connection with the server 200 on the basis of two hops to detect a man-in-the-middle attack at a position within a second hope from the electronic device 100.

In addition, even in a case in which the number of hops included in the network path connecting the electronic device 100 and the server 200 to each other is not identified, the electronic device 100 according to an embodiment of the disclosure may attempt the communication connection on the basis of an obviously smaller number of hops than the number of hops included in the network path connecting the electronic device 100 and the server 200 to each other, and determine whether or not the man-in-the-middle attack is detected on the basis of whether or not the communication connection is established according to the attempt.

Particularly, when a network path including an x-th hop from the electronic device 100 corresponds to a path in which security may be trusted, even in the case in which the number of hops included in the network path connecting the electronic device 100 and the server 200 to each other is not identified, the electronic device 100 may attempt the communication connection with the server 200 on the basis of x−1 hops to detect a man-in-the-middle attack at a position within an x−1-th hop from the electronic device 100, thereby efficiently confirming security of the network.

Figure 6:
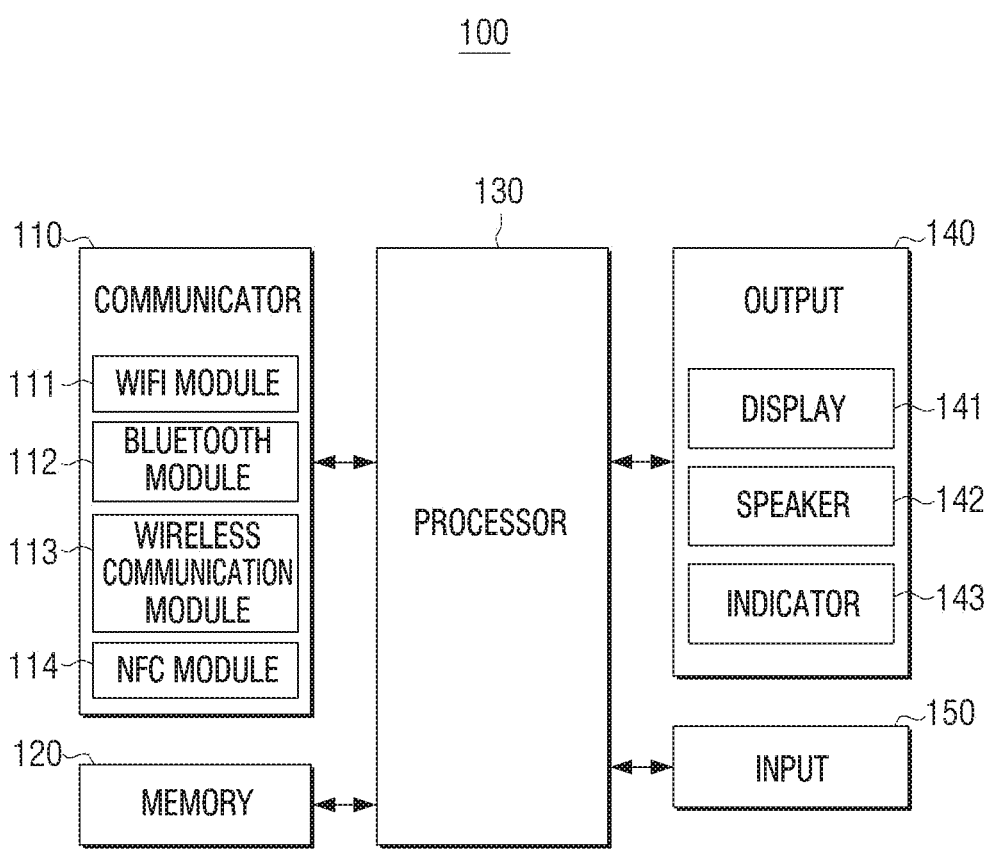
FIG. 6 is a block diagram illustrating components of an electronic device according to an embodiment of the disclosure.
Figure 7:
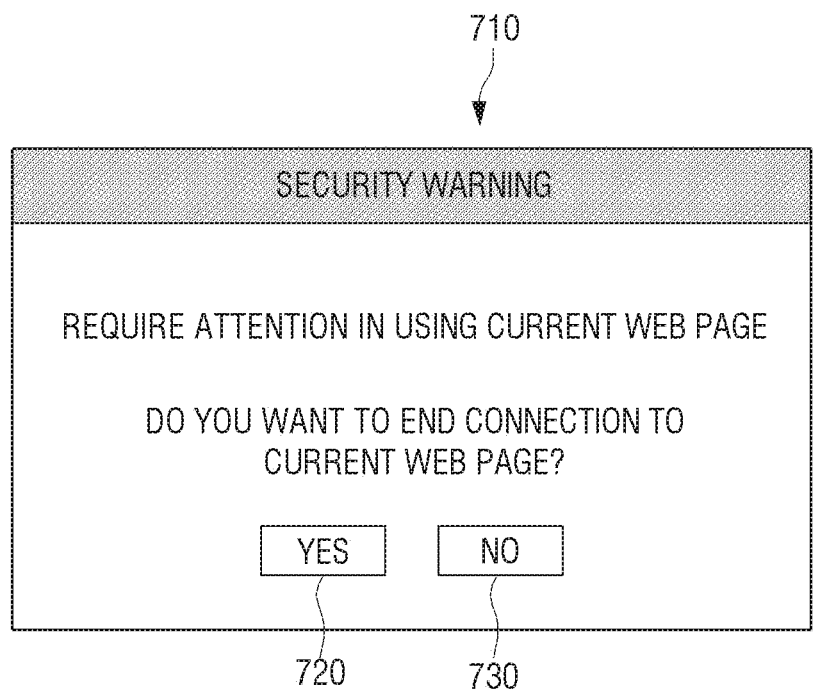
FIG. 7 is a view illustrating a user interface providing a security warning notification in a case in which a man-in-the-middle attack is detected according to an embodiment of the disclosure.

FIG. 6 is a block diagram illustrating components of an electronic device according to an embodiment of the disclosure in detail, and FIG. 7 is a view illustrating a user interface providing a security warning notification in a case in which a man-in-the-middle attack is detected according to an embodiment of the disclosure.

Referring to FIG. 6, the electronic device 100 according to an embodiment of the disclosure may not only include the communicator 110, the memory 120, and the processor 130, but may also include an output 140 and an input 150. However, such components are only examples, and new components may be added to such components or some of such components may be omitted in practicing the disclosure.

The communicator 110 may include at least one of the WiFi module 111, the Bluetooth module 112, the wireless communication module 113, or the near field communication (NFC) module 114.

The output 140 may include a circuit, and the processor 130 may output various functions that may be performed by the electronic device 100 through the output 140. In addition, the output 140 may include at least one of a display 141, a speaker 142, or an indicator 143.

The display 141 may output image data by control of the processor 130. Specifically, the display 141 may output an image pre-stored in the memory 120 by control of the processor 130. Particularly, the display 141 according to an embodiment of the disclosure may display a user interface stored in the memory 120.

The display 141 may be implemented by a liquid crystal display (LCD) panel, an organic light emitting diode (OLED) or the like. In some case, the display 141 may also be implemented by a flexible display, a transparent display or the like. However, the display 141 according to the disclosure is not limited to a specific type.

The speaker 142 may output audio data by control of the processor 130, and the indicator 143 may be turned on by control of the processor 130.

Particularly, in diverse embodiments of the disclosure, the processor 130 may provide a notification for security of the network through the output 140 when it is determined that the man-in-the-middle attack exists in the network. The notification for the security of the network may be provided as the user interface through the display 141.

Referring to FIG. 7, the processor 130 may provide a user interface 710 including a message such as "Security warning", "Require attention in using current web page", and "Do you want to end connection to current web page?" through the display 141.

The processor 130 may output a speech for providing the notification for the security of the network through the speaker 142, and may control the indicator 143 to be turned on to provide the notification for the security of the network.

When the security warning notification as described above is provided, the user of the electronic device 100 may input a user command through the input 150 as described below to determine whether or not to maintain the communication connection with the server 200 depending on his/her selection.

The input 150 may include a circuit, and the processor 130 may receive a user command for controlling an operation of the electronic device 100 through the input 150. Specifically, the input 150 may include components such as a camera (not illustrated), a microphone (not illustrated), a remote-control signal receiver (not illustrated), and the like. In addition, the input 150 may also be implemented in a form in which it is included in the display 141 as a touch screen.

According to an embodiment of the disclosure, the user of the electronic device 100 may input the user command through the input 150 to determine whether or not to maintain the communication connection with the server 200. Particularly, when the security warning notification is provided through the output 140 as described above, the user may input the user command through the input 150 to actively determine whether or not to maintain the communication connection with the server 200.

Specifically, the user receiving the security warning notification provided through the user interface 710 as illustrated in FIG. 7 may input a user command for ending the communication connection with the server 200 by selecting "YES" 720 of selection commands included in the user interface.

In this case, additionally, a user command for performing communication with the server 200 may be input through a network that may relatively further trust security as compared with a current network. For example, in a case in which the communication connection with the server 200 is currently established through a WiFi network, the user receiving the security warning notification as described above may input the user command for performing communication with the server 200 through a mobile network having a relatively high security.

The user may desire to maintain the communication connection with the server 200 in spite of the security warning notification as described above. Specifically, the user may desire to maintain the communication connection with the server 200 in a case in which it is determined that erroneous detection is generated as in a case in which the security warning notification is generated in that a communication connection with an intermediate device recognized by the user is established. Furthermore, the user desire to maintain the communication connection with the server 200 even though it is determined that the security warning notification is generated by the man-in-the-middle attack.

In this case, the user may input a user command for maintaining the communication connection with the server 200 by selecting "NO" 730 of the selection commands included in the user interface 710 as illustrated in FIG. 7.

According to an embodiment of the disclosure, the electronic device 100 may transmit information on security of the network to the external device connected to the electronic device through the communicator 110 when it is determined that the man-in-the-middle attack exists in the network.

Particularly, in a case in which the electronic device 100 according to the disclosure does not include the display, when the electronic device 100 transmits the information on the security of the network to the external device connected to the electronic device through the communicator 110, the external device including a display may provide the notification for the security of the network through the display on the basis of the received information on the security of the network.

According to an embodiment of the disclosure, the electronic device 100 may also end the communication connection with the server 200 without providing the notification for the security of the network through the output 140 when it is determined that the man-in-the-middle attack exists in the network.

According to an embodiment about the security warning notification as described above, the user of the electronic device 100 may recognize the fact that the man-in-the-middle attack may exist in the network connecting the server 200 corresponding to the obtained IP address and the electronic device 100 to each other, and pay attention to whether or not to maintain the communication connection with the server 200. In addition, in this case, the user may actively determine whether or not to maintain the communication connection with the server 200 by inputting the user command through the input 150.

Figure 8:
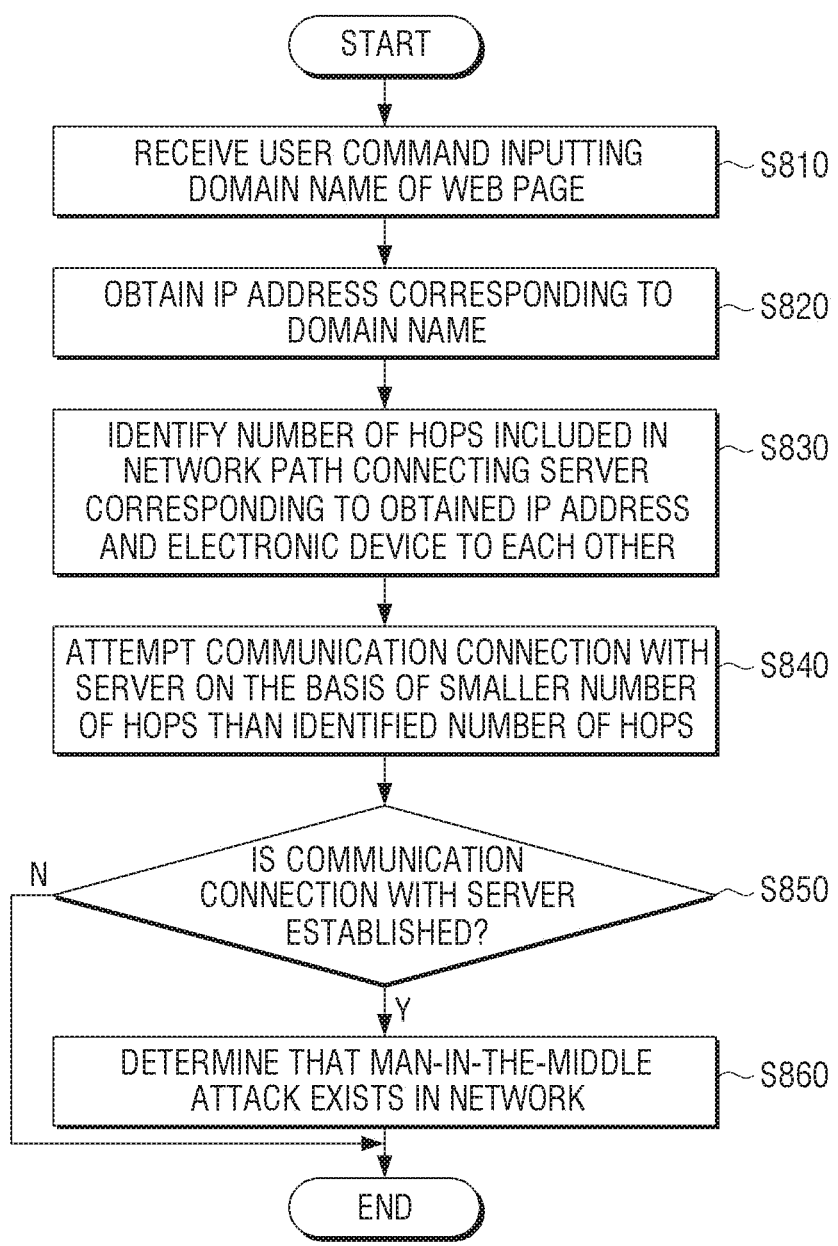
FIG. 8 is a flowchart for describing a control method of an electronic device according to an embodiment of the disclosure.

FIG. 8 is a flowchart for describing a control method of an electronic device according to an embodiment of the disclosure.

Referring to FIG. 8, the electronic device 100 according to an embodiment of the disclosure receives the user command inputting the domain name of the web page at S810.

When the user command inputting the domain name of the web page is received, the electronic device 100 obtains the IP address corresponding to the input domain name at S820. Specifically, when the user command inputting the domain name of the web page is received, the electronic device 100 may obtain the IP address corresponding to the input domain name from the DNS server.

When the IP address is obtained, the electronic device 100 identifies the number of hops included in the network path connecting the server 200 corresponding to the obtained IP address and the electronic device 100 to each other at S830.

Here, the hop refers to a part of a path positioned between an origination and a destination of a network. In addition, the number of hops is the number of intermediate devices through which a data packet should pass in a process of starting from the origination of the network and then arriving at the destination of the network, and becomes a reference in measuring a network distance.

When the number of hops included in the network path connecting the server 200 and the electronic device 100 to each other is identified, the electronic device 100 attempts the communication connection with the server 200 on the basis of the smaller number of hops than the identified number of hops at S840. In addition, when the communication connection with the server 200 is established on the basis of the smaller number of hops than the identified number of hops at S850 (Y), the electronic device 100 determines that the man-in-the-middle attack exists in the network at S860. Otherwise, the operation ends at S850 (N).

That is, in a case in which the man-in-the-middle attack does not exist in the network connecting the server 200 and the electronic device 100 to each other, even though a communication connection with the server 200 is attempted on the basis of the smaller number of hops than the identified number of hops, the communication connection may not be established, but in a case in which the man-in-the-middle attack exists, a communication connection may be established in a relationship with the man-in-the-middle on the basis of the smaller number of hops than the identified number of hops.

A process of determining whether or not the communication connection is established on the basis of the smaller number of hops than the identified number of hops may be performed by setting a TTL value included in a header of an IP packet to be smaller than the identified number of hops to attempt a TCP handshake and determining whether or not the communication connection is established according to the attempt.

Furthermore, the process of determining whether or not the communication connection is established on the basis of the smaller number of hops than the identified number of hops may also be performed by setting a TTL value included in a header of an IP packet to be the same as the identified number of hops to attempt a TCP handshake and determining whether or not a TTL value included in a response packet to the attempt is smaller than the TTL value of the IP packet.

According to an embodiment of the disclosure, the electronic device 100 may perform a filtering process before performing the detection process of a man-in-the-middle attack, and perform the detection process of a man-in-the-middle as described above only in a case in which an IP corresponds to an IP in which a possibility that the man-in-the-middle attack will occur is relatively high.

Specifically, the electronic device 100 may perform the detection process of a man-in-the-middle attack as described above in at least one of a case in which an HTTP connection with the server 200 is established on the basis of the obtained IP address, a case in which an HTTPS connection with the server 200 is established on the basis of the obtained IP address, a case in which it is determined that an IP address corresponding to a first domain name and an IP address corresponding to a second domain name different from the first domain name are the same as each other, or a case in which the obtained IP address is a public IP address.

The filtering process that may be performed before performing the detection process of a man-in-the-middle attack has been described in detail with reference to FIGS. 3A, 3B and 4, and an overlapping description therefor is thus omitted.

The control method of an electronic device 100 according to the embodiment described above may be implemented by a program and be provided to the electronic device 100. Particularly, a program including the control method of an electronic device 100 may be stored and provided in a non-transitory computer readable medium.

Specifically, in a computer readable recording medium including the program for executing the control method of an electronic device 100, the control method of an electronic device 100 may include obtaining the IP address corresponding to the domain name of the web page when the user command inputting the domain name is received, identifying the number of hops included in the network path connecting the server 200 corresponding to the obtained IP address and the electronic device 100 to each other, and determining that the man-in-the-middle attack exists in the network when the communication connection with the server 200 is established on the basis of the smaller number of hops than the identified number of hops.

Here, the non-transitory computer readable medium is not a medium that stores data therein for a while, such as a register, a cache, a memory, or the like, but means a medium that semi-permanently stores data therein and is readable by a machine. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to the diverse embodiments of the disclosure as described above, the electronic device 100 may attempt the communication connection with the server 200 on the basis of the smaller number of hops than the number of hops included in the network path connecting the electronic device 100 and the server 200 to each other, and detect the man-in-the-middle attack on the basis of reachability according to the attempt.

In addition, the disclosure is not limited to a specific attack scenario of the man-in-the-middle attack, and may be applied to various types of man-in-the-middle attacks in that the man-in-the-middle attack is detected by confirming the reachability itself with the man-in-the-middle.

In addition, the electronic device 100 according to the disclosure may perform the filtering process before performing the detection process of a man-in-the-middle attack, and perform the detection process of a man-in-the-middle attack as described above only in the case in which the IP corresponds to the IP in which the possibility that the man-in-the-middle attack will occur is relatively high, thereby improving the efficiency of the detection process of a man-in-the-middle.

In addition, even in a case in which the number of hops included in the network path connecting the electronic device 100 and the server 200 to each other is not identified, the electronic device 100 according to the disclosure may attempt the communication connection on the basis of the specific number of hops and determine whether or not the man-in-the-middle attack is detected on the basis of whether or not the communication connection is established according to the attempt, thereby efficiently confirming the security of the network.

Further, in the case in which it is determined that the man-in-the-middle attack exists in the network, the electronic device 100 according to the disclosure may provide the notification for the security of the network to induce the user of the electronic device 100 to pay attention to whether or not to maintain the communication connection with the server 200 and actively determine whether or not to maintain the communication connection with the server 200.

Each of components (for example, modules or programs) according to the diverse embodiments of the disclosure as described above may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner.

Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

Terms "~er/or" or "module" used in the disclosure may include units configured by hardware, software, or firmware, and may be used compatibly with terms such as, for example, logics, logic blocks, components, circuits, or the like. The term "~er/or" or "module" may be an integrally configured component or a minimum unit performing one or more functions or a part thereof. For example, the module may be configured by an application-specific integrated circuit (ASIC).

The diverse embodiments of the disclosure may be implemented by software including instructions stored in a machine-readable storage medium (for example, a computer-readable storage medium). A machine may be a device that invokes the stored instruction from the storage medium and may be operated depending on the invoked instruction, and may include the electronic device (for example, the electronic device 100) according to the disclosed embodiments.

In a case where a command is executed by the processor, the processor may directly perform a function corresponding to the command or other components may perform the function corresponding to the command under a control of the processor. The command may include codes created or executed by a compiler or an interpreter.

The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

According to an embodiment, the methods according to the diverse embodiments disclosed in the disclosure may be included and provided in a computer program product. The computer program product may be traded as a product between a seller and a purchaser.

The computer program product may be distributed in a form of a storage medium (for example, a compact disc read only memory (CD-ROM)) that may be read by the machine or online through an application store (for example, Play Store™). In a case of the online distribution, at least portions of the computer program product may be at least temporarily stored in a storage medium such as a memory of a server of a manufacturer, a server of an application store, or a relay server or be temporarily created.

Each of components (for example, modules or programs) according to the diverse embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner.

Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a communicator;
    a memory including at least one command; and
    at least one processor configured to execute the at least one command to:
        based on a user command inputting a first domain name, obtain a first Internet protocol (IP) address corresponding to the first domain name,
        based on a user command inputting a second domain name, obtain a second IP address corresponding to the second domain name, the second domain name being different from the first domain name,
        based on the first IP address being identical to the second IP address, identify a first number of hops included in a network path connecting a server corresponding to the first IP address and the electronic device to each other, and
        when a communication connection with the server is established based on a second number of hops smaller than the first number of hops, determine that a man-in-the-middle attack exists at a position within the second number of hops from the electronic device in the network path, and
        based on the communication connection with the server not being is established, attempt a communication connection while sequentially increasing a number of hops from one hop,
    wherein the at least one processor is further configured to:
        based on the first number of hops included in the network path connecting the server being not identified, determine that the man-in-the-middle attack exists at a position within a predetermined number of hops from the electronic device, and
    wherein the man-in-the-middle attack existing at the position within the predetermined number of hops from the electronic device comprises a man-in-the-middle attack for an access point for WiFi communication with the server or a man-in-the-middle attack in a sub-network same as the access point.

2. The electronic device as claimed in claim 1, wherein the at least one processor is further configured to identify the first number of hops included in the network path connecting the server corresponding to the first IP address and the electronic device to each other based on information on the first number of hops stored in the memory.

3. The electronic device as claimed in claim 1, wherein the at least one processor is further configured to:
    identify the first number of hops included in the network path connecting the server corresponding to the first IP address and the electronic device to each other when a hypertext transfer protocol (HTTP) connection with the server is established based on the first IP address, and
    determine that the man-in-the-middle attack exists in the network path when the communication connection with the server is established based on the second number of hops smaller than the first number of hops.

4. The electronic device as claimed in claim 1, wherein the at least one processor is further configured to:
    identify the first number of hops included in the network path connecting the server corresponding to the first IP address and the electronic device to each other when a hypertext transfer protocol secure (HTTPS) connection with the server is established based on the first IP address, and
    determine that the man-in-the-middle attack exists in the network path when the communication connection with the server is established based on the second number of hops smaller than the first number of hops.

5. The electronic device as claimed in claim 1, wherein the at least one processor is further configured to:
    identify the first number of hops included in the network path connecting the server corresponding to the first IP address and the electronic device to each other when it is determined that the first IP address corresponding to the first domain name and an IP address corresponding to a domain name different from the first domain name are identical to each other, and
    determine that the man-in-the-middle attack exists in the network path when the communication connection with the server is established based on the second number of hops smaller than the first number of hops.

6. The electronic device as claimed in claim 1, wherein the at least one processor is further configured to:
    identify the first number of hops included in the network path connecting the server corresponding to the first IP address and the electronic device to each other when the first IP address is a public IP address, and
    determine that the man-in-the-middle attack exists in the network path when the communication connection with the server is established based on the second number of hops smaller than the first number of hops.

7. The electronic device as claimed in claim 1, wherein the at least one processor is further configured to:
    obtain the first IP address corresponding to the first domain name of a web page when the user command inputting the first domain name is received, and
    determine that the man-in-the-middle attack exists in the network path when the communication connection with the server corresponding to the first IP address is established based on one hop.

8. The electronic device as claimed in claim 1, wherein the at least one processor is further configured to provide a notification for security of the network path through an output when it is determined that the man-in-the-middle attack exists in the network path.

9. The electronic device as claimed in claim 1, wherein the at least one processor is further configured to end the communication connection with the server when it is determined that the man-in-the-middle attack exists in the network path.

10. The electronic device as claimed in claim 1, wherein the at least one processor is further configured to transmit information on security of the network path to an external device connected to the electronic device through the communicator when it is determined that the man-in-the-middle attack exists in the network path.

11. The electronic device as claimed in claim 1, wherein the at least one processor is further configured to:
determine whether or not the communication connection is established based on the second number of hops by setting a time to live (TTL) value included in a header of an IP packet to be smaller than the first number of hops to attempt a TCP handshake, and
determine whether or not the communication connection is established according to the attempt.

12. The electronic device as claimed in claim 1, wherein the at least one processor is further configured to:
determine whether or not the communication connection is established based on the second number of hops by setting a TTL value included in a header of an IP packet to be the same as the first number of hops to attempt a TCP handshake, and
determine whether or not a TTL value included in a response packet to the attempt is smaller than the TTL value of the IP packet.

13. A control method of an electronic device, comprising:
based on a user command inputting a first domain name, obtaining a first Internet protocol (IP) address corresponding to the first domain name;
based on a user command inputting a second domain name, obtaining a second IP address corresponding to the second domain name, the second domain name being different from the first domain name;
based on the first IP address being identical to the second IP address, identifying a first number of hops included in a network path connecting a server corresponding to the first IP address and the electronic device to each other;
when a communication connection with the server is established based on a second number of hops smaller than the first number of hops, determining that a man-in-the-middle attack exists at a position within the second number of hops from the electronic device in the network path;
based on the communication connection with the server not being is established, attempting a communication connection while sequentially increasing a number of hops from one hop; and
based on the first number of hops included in the network path connecting the server being not identified, determining that the man-in-the-middle attack exists at a position within a predetermined number of hops from the electronic device,
wherein the man-in-the-middle attack existing at the position within the predetermined number of hops from the electronic device comprises a man-in-the-middle attack for an access point for WiFi communication with the server or a man-in-the-middle attack in a subnetwork same as the access point.

14. The control method as claimed in claim 13, wherein in the identifying of the first number of hops, the first number of hops included in the network path connecting the server corresponding to the first IP address and the electronic device to each other is identified based on information on the first number of hops stored in a memory.

15. The control method as claimed in claim 13, wherein in the identifying of the first number of hops, the first number of hops included in the network path connecting the server corresponding to the first IP address and the electronic device to each other is identified when an HTTP connection with the server is established based on the first IP address.

16. The control method as claimed in claim 13, wherein in the identifying of the first number of hops, the first number of hops included in the network path connecting the server corresponding to the first IP address and the electronic device to each other is identified when an HTTPS connection with the server is established based on the first IP address.

17. The control method as claimed in claim 13, wherein in the identifying of the first number of hops, the first number of hops included in the network path connecting the server corresponding to the first IP address and the electronic device to each other is identified when it is determined that the first IP address corresponding to the first domain name and an IP address corresponding to a domain name different from the first domain name are identical to each other.

18. The control method as claimed in claim 13, wherein in the identifying of the first number of hops, the first number of hops included in the network path connecting the server corresponding to the first IP address and the electronic device to each other is identified when the first IP address is a public IP address.

19. The control method as claimed in claim 13, wherein in the determining that the man-in-the-middle attack exists, it is determined that the man-in-the-middle attack exists in the network path when the communication connection with the server corresponding to the first IP address is established based on one hop.

20. A non-transitory computer readable recording medium including a program for executing a control method of an electronic device, wherein the control method comprises:
based on a user command inputting a first domain name, obtaining a first IP address corresponding to the first domain name;
based on a user command inputting a second domain name, obtaining a second IP address corresponding to the second domain name;
based on the first IP address being identical to the second IP address, identifying a first number of hops included in a network path connecting a server corresponding to the first IP address and the electronic device to each other;
when a communication connection with the server is established based on a second number of hops smaller than the first number of hops, determining that a man-in-the-middle attack exists at a position within the second number of hops from the electronic device in the network path;
based on the communication connection with the server not being is established, attempting a communication connection while sequentially increasing a number of hops from one hop; and
based on the first number of hops included in the network path connecting the server being not identified, determining that the man-in-the-middle attack exists at a position within a predetermined number of hops from the electronic device,
wherein the man-in-the-middle attack existing at the position within the predetermined number of hops from the electronic device comprises a man-in-the-middle attack for an access point for WiFi communication with the server or a man-in-the-middle attack in a subnetwork same as the access point.

\* \* \* \* \*